Jan. 13, 1953 D. T. WATKINS 2,624,954
GRADE METER

Filed May 12, 1950 2 SHEETS—SHEET 1

INVENTOR
DAVID T. WATKINS

BY
McMorrow, Berman & Davidson
ATTORNEY

Jan. 13, 1953 — D. T. WATKINS — 2,624,954
GRADE METER
Filed May 12, 1950 — 2 SHEETS—SHEET 2
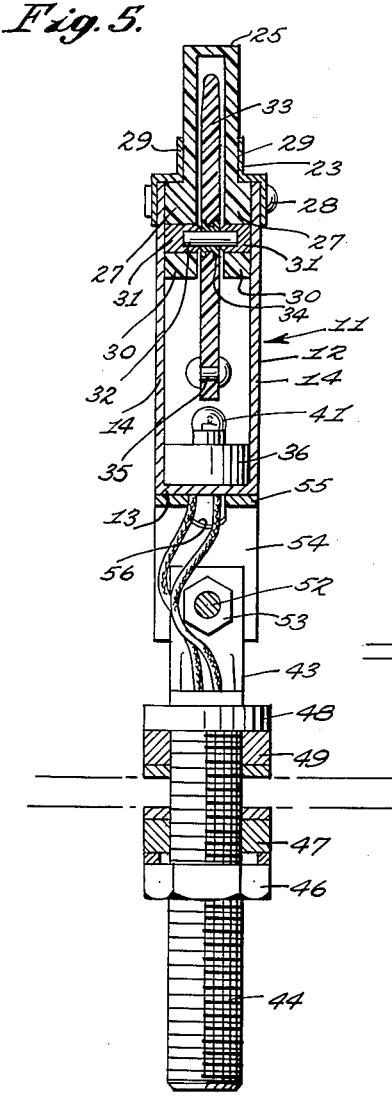
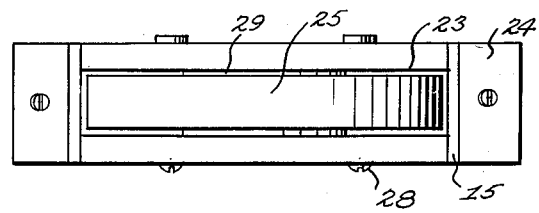
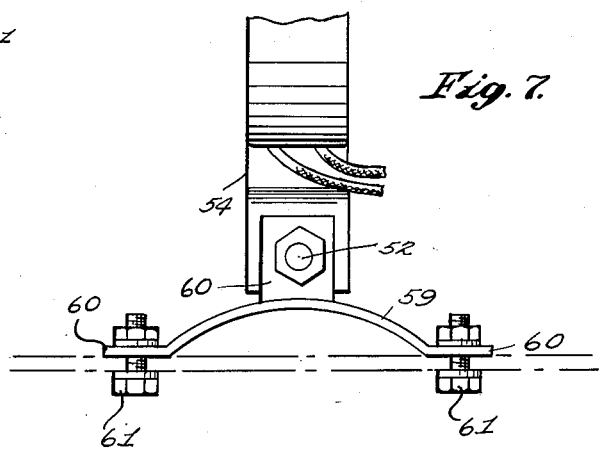
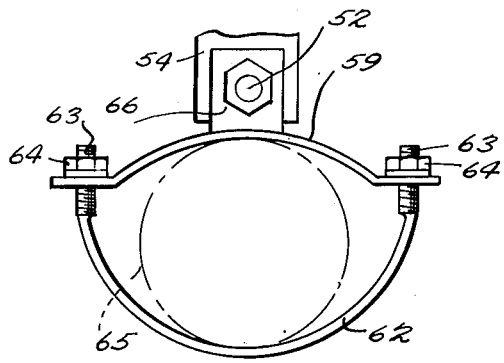
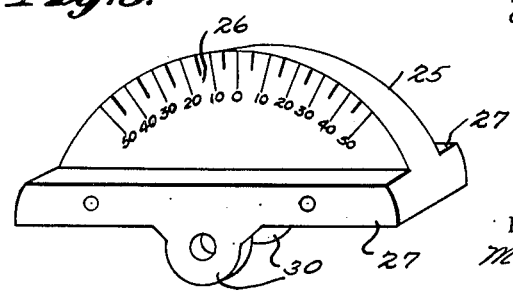
INVENTOR
DAVID T. WATKINS
BY McMorrow, Berman & Davidson
ATTORNEY Patented Jan. 13, 1953

2,624,954

UNITED STATES PATENT OFFICE 2,624,954

GRADE METER

David T. Watkins, Lacon, Ill.

Application May 12, 1950, Serial No. 161,541

2 Claims. (Cl. 33—215)

1

This invention relates to grade indicators for vehicles, and more particularly to a grade indicator for use on a motor vehicle.

A main object of the invention is to provide a novel and improved grade indicator which is very simple in construction, which is easy to install on a motor vehicle, which occupies a very small space, and which gives a clear indication of the inclination of a grade over which the vehicle is passing.

A further object of the invention is to provide an improved grade indicator for use in motor vehicles, said indicator being inexpensive to manufacture, involving only a few parts, being neat in appearance, being easy to adjust to operating position, and being very rugged in construction.

Further objects and advantages of the invention will become apparent from the following description and claims, and from the accompanying drawings, wherein:

Figure 2 is a side elevational view, partly in cross-section, of the improved grade indicator illustrated in Figure 1;

Figure 3 is a fragmentary perspective detail view showing the side portion of the main housing of the grade indicator prior to the assembly of the device;

Figure 4 is an enlarged cross-sectional detail view taken on line 4—4 of Figure 2;

Figure 5 is a cross-sectional view taken on line 5—5 of Figure 2;

Figure 6 is a top plan view of the device;

Figure 7 is a fragmentary elevational detail view showing a modified form of mounting bracket for the device;

Figure 8 is an elevational detail view showing still another modified form of mounting bracket for the device;

Figure 9 is a perspective detail view of the transparent calibrated top cover of the device.

Figure 1:
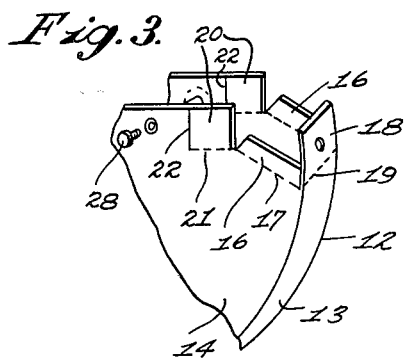
Figure 1 is a perspective view of the forward portion of the passenger compartment of a motor vehicle, showing an improved grade indicator according to the present invention mounted upon the top portion of the vehicle cowling subadjacent to the windshield.
Figure 1:
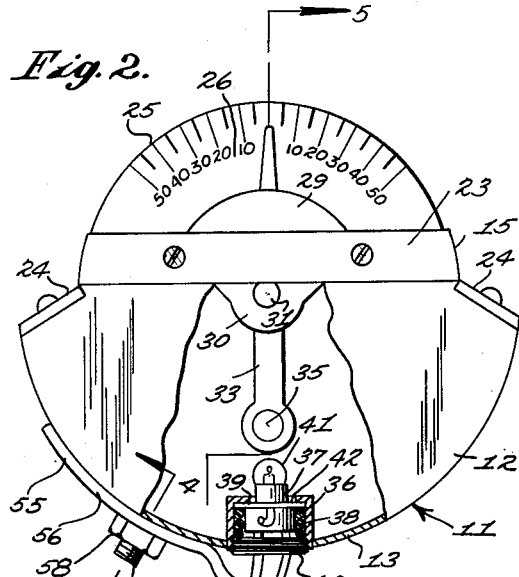
Figure 1:
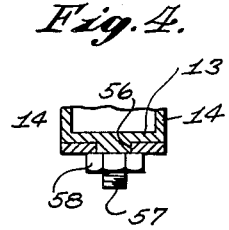
Figure 1:
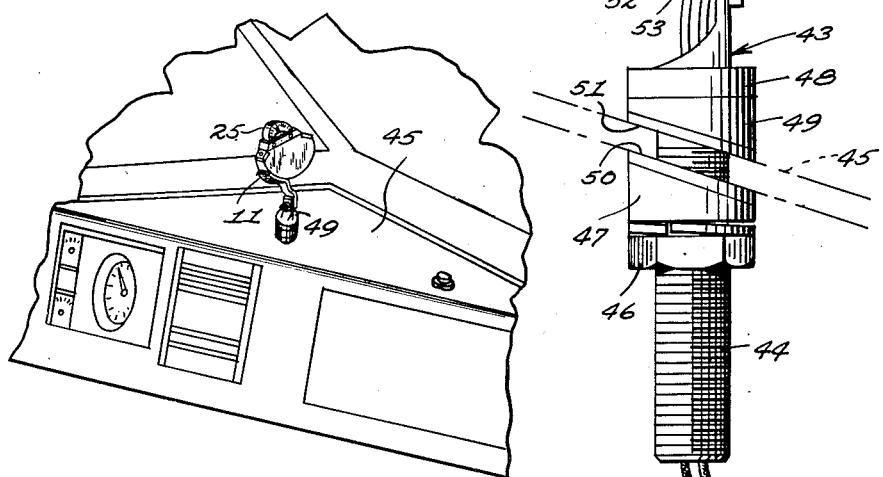

Referring to the drawings, and more particularly to Figures 1 to 6 and 9, the device is generally designated at 11 and comprises a main housing 12 of brass or other suitable sheet metal, said main housing having an arcuate bottom wall 13, side walls 14, 14, and having secured to its top portion a collar member, shown at 15. As shown in Figure 3, the housing 12 is formed at its top corners with bendable, longitudinal tabs

2 shown at 16, 16 which are bendable inwardly on the dotted line shown at 17 and with end tabs 18 bendable inwardly on the dotted line 19. Designated at 20, 20 are further tabs bendable on the lines 21, 21 inwardly in the same manner as the tabs 16, 16. As shown in Figure 3, the walls 14 are slit at 22, 22 to free the tabs 20, 20 for inward bending.

In forming the housing 12 to its required configuration, the tabs 16, 16 are bent inwardly so as to meet at their inner edges, and the tabs 20, 20 are bent in the same manner, said tabs being suitably soldered or otherwise secured together, and the tab 18 at each side of the housing is bent inwardly to overlie the tabs 16, 16. The collar member 15 may comprise a metal stamping having the inwardly offset collar portion 23 and having the marginally flanged end tabs 24, 24 adapted to overlie and be secured to the downwardly folded tabs 18 of the housing 12. Designated at 25 is a transparent cover member which is arcuately shaped, as shown in Figure 2, and which has an angularly calibrated scale 26 on each side face thereof. The cover 25 is formed with longitudinal bottom flanges 27, 27 received within the top portions of the housing walls 14, 14 and secured thereto by suitable fastening screws 28. The screws 28 pass through the depending outer flanges of the collar element 23, as shown in Figure 5. The collar member 23 is provided with the opposed longitudinally extending, inwardly offset, arcuate vertical flanges 29, 29, as shown in Figures 2 and 5.

The transparent cover member 25 is formed with depending apertured opposing central lugs 30, 30 in which are secured the plug members 31, 31. Secured in the plug members 31, 31 is the hardened metal shaft element 32. As shown in Figure 5, the inner ends of the plug members 31, 31 are beveled. Rotatably mounted on the shaft 32 is the pointer 33, said pointer being provided with a bushing 34 which surrounds the shaft 32 and which functions as a bearing. Free rotation of the bushing 34 on the shaft 32 is facilitated by beveling the inner ends of the plug members 31, as above described. Secured in the lower end of the pointer 33 is a heavy rivet 35 of lead or other suitable material providing a weighting effect on the bottom end of the pointer.

The weighted rivet 35 acts to bias the pointer 33 to a vertical position at all times, and when the housing 12 is inclined around the axis of the shaft 32, the pointer will indicate the angle of inclination on the scales 26. In this connection, it is to be noted that the arcuate cover 25 has its center of curvature substantially at the axis of rotation of the pointer 33.

Secured in the bottom portion of the housing 12 is a cylindrical housing 36 in which is mounted a flanged lamp socket 37, the lamp socket being held in position by a coil spring 38 bearing between the flange 39 of the lamp socket and an annular nut 40 threaded into the lower portion of the housing 36. The lamp socket 37 is formed with the usual bayonet slots and positioned in the socket is a lamp 41 provided with pins engageable in said bayonet slots in the usual manner. The lamp 41 extends upwardly into the housing 12 through an aperture 42 provided in the top wall of the cylindrical housing 36.

Designated generally at 43 is a bracket comprising a threaded tubular member 44 adapted to be secured in the top wall 45 of the cowling of a vehicle in the manner shown in Figure 1, as by a nut 46 screwed on the lower portion of the tubular member 44, which bears on a bushing 47 engaging beneath the cowling wall 45, the top of the tubular member 44 being provided with a rigid flange 48 and with a bushing 49 below said flange. The bushings 47 and 49 have opposing inclined parallel surfaces 50, 51, whereby the tubular member 44 may be rigidly secured in a vertical position to an inclined top wall 45. Secured to the top end of the bracket 43, as by a bolt 52 and nut 53, is a supporting arm 54, the bolt 52 being substantially horizontal, whereby the arm 54 may be adjusted angularly around the horizontal axis of said bolt. The upper portion of the arm 54 is arcuately curved, as shown at 55, to conform with and to fit against the bottom wall 13 of the housing 12, said upper portion being longitudinally slotted, as shown at 56, to receive a threaded stud 57 rigidly secured to and projecting downwardly from said bottom wall 13. A nut 58 is provided on the stud 57 to lock the housing 12 in an adjusted angular position on the curved arm 55. The center of curvature of the bottom wall 13 is substantially at the axis of the bearing shaft 32, whereby angular adjustment of the housing 12 will be around the same shaft axis as the pointer 33. The axis of the bolt 42, however, is located substantially in the same plane as the housing 12, whereby adjustment around the axis of bolt 52 comprises adjustment of the housing for rotation around an axis coplanar therewith.

Figure 7 shows an alternative form of mounting bracket for the arm 54, said mounting bracket comprising a downwardly facing bowed strap member 59 provided with end tabs 60, 60 which may be fastened to the top cowling wall of the vehicle by means of fastening bolts 61, 61.

Figure 8 illustrates a further alternative form of mounting bracket for the arm 54 which employs the strap member 59 of Figure 7, but which is provided with a U-shaped fastening bolt 62 having threaded ends 63, 63 engageable through the tabs 60, 60 and securable thereon by means of nuts 64, 64, as shown in Figure 8. The device may be mounted by clamping the steering post, shown in dotted view at 65, between the strap member 59 and the bolt 62, as shown in Figure 8, or by clamping any other supporting column or stationary post member in the interior of the motor vehicle.

As shown in Figures 7 and 8, the strap member 59 is formed with an upstanding tab element 66, whereby the bolt 52 may extend through said tab element and secure the arm 54 to said strap member.

When the device is installed, employing any one of the various bracket structures shown respectively in Figures 2, 7 or 8, the housing 12 is first adjusted with the vehicle on level ground, so that it extends in the longitudinal vertical plane of the vehicle and so that the pointer 33 indicates zero grade. Therefore, whenever the vehicle either ascends or descends a grade, the pointer 33 will tend to remain in a vertical position due to the weighting effect of the rivet 35, and inclination of the vehicle will register on the scale 26 within clear view of the driver of the vehicle. This will advise the driver as to the necessity of applying the brakes or of shifting to a lower gear drive. The lamp 41 may be connected in parallel with the instrument lighting circuit of the vehicle dashboard or may be connected in parallel with the head lamp lighting circuit of the vehicle, whereby under night driving conditions the lamp 41 will be illuminated and will illuminate the transparent top cover 25 so that the position of the pointer 33 will be easily visible therein. The pointer 33 is preferably made of dark plastic material, whereas the top cover 25 is preferably made of clear transparent plastic material.

While a specific embodiment of a grade meter for motor vehicles has been disclosed in the foregoing description, it will be understood that various modifications within the spirit of the invention may occur to those skilled in the art. Therefore, it is intended that no limitations be placed on the invention except as defined by the scope of the appended claims.

What is claimed is:

1. In a grade meter for use on a motor vehicle, a relatively flat vertical housing, said housing comprising an arcuate bottom wall and upstanding side walls secured to said arcuate bottom wall, a bracket adapted to be secured to a portion of the vehicle and having a slotted arcuate arm engaging said arcuate bottom wall, fastening means projecting from said bottom wall through said slotted arm and clamping said bottom wall in adjused position along the slot in said arm, an upstanding arcuate transparent top cover secured to the top of said housing, said top cover comprising a top wall concentric with said bottom wall, depending side walls secured to said top wall, said depending side walls being inscribed on an outer surface thereof with an angle scale, a vertical pointer pivoted in said top cover on a transverse axis through the common center of said top cover and bottom wall, said common center being centrally located relative to said angle scale, and a transverse weighting bar element secured in the lower end of the pointer, biasing said pointer to a vertical position.

2. In a grade meter for use on a motor vehicle, a relatively flat vertical housing, said housing comprising an arcuate bottom wall and upstanding side walls secured to said bottom wall, a bracket adapted to be secured to a portion of the vehicle and having a slotted arcuate arm engaging said arcuate bottom wall, a depending radial stud projecting from said bottom wall through said slotted arm, a nut on said stud clamping said bottom wall in adjusted position along the slot in said arm, an upstanding arcuate transparent top cover secured to the top of said housing, said top cover comprising an arcuate top wall of substantially smaller radius than said bottom wall but being concentric therewith, and depending opposite outer side walls, said top cover being inscribed on the opposite outer side walls thereof with angle scales, outwardly projecting flanges integral with said depending side walls, means for securing said flanges to said housing, a vertical pointer pivoted in said depending side walls on a transverse axis through the common center of said top cover and bottom wall, said common center being centrally located relative to said angle scales, and a transverse weighting bar element secured in the lower end of the pointer, biasing said pointer to a vertical position.

DAVID T. WATKINS.

REFERENCES CITED

The following references are of record in the file of this patent:

UNITED STATES PATENTS

| Number | Name | Date |
|---|---|---|
| 645,269 | Morgan | Mar. 13, 1900 |
| 729,521 | Allard | June 2, 1903 |
| 841,562 | Nelson | Jan. 15, 1907 |
| 841,598 | Stricker | Jan. 15, 1907 |
| 1,366,430 | Sperry | Jan. 25, 1921 |
| 1,552,140 | Gobatti | Sept. 1, 1925 |
| 2,021,667 | Miess | Nov. 19, 1935 |
| 2,043,162 | Foster | June 2, 1936 |
| 2,342,359 | Mitchell | Feb. 22, 1944 |

FOREIGN PATENTS

| Number | Country | Date |
|---|---|---|
| 260,894 | Switzerland | Apr. 15, 1949 |